United States Statutory Invention Registration [19]

[11] Reg. Number: H744

Iverson [43] Published: Feb. 6, 1990

[54] PORCELAIN ENAMEL NEUTRON ABSORBING MATERIAL

[75] Inventor: Daniel C. Iverson, Aiken, S.C.

[73] Assignee: The United States of America as represented by the Department of Energy, Washington, D.C.

[21] Appl. No.: 123,462

[22] Filed: Nov. 20, 1987

[51] Int. Cl.[4] ..... C04B 35/68; G21C 5/12

[52] U.S. Cl. ..... 252/478

[58] Field of Search ..... 252/478; 376/349

[56] References Cited

U.S. PATENT DOCUMENTS

| | | | |
|---|---|---|---|
| 3,950,271 | 4/1976 | Linares | 252/478 |
| 4,173,187 | 11/1979 | Steverding | 102/105 |
| 4,298,579 | 11/1981 | Kuhn et al. | 423/11 |
| 4,591,479 | 5/1986 | Weitzberg | 376/349 |
| 4,599,319 | 7/1986 | Sack | 501/57 |
| 4,684,497 | 8/1987 | Chubb | 376/419 |

OTHER PUBLICATIONS

Sun, et al., "Neutron Absorbing and Transmitting Glass" *The Glass Industry,* 1950, 31 (10), pp. 507–515.

Melnick, et al., "Neutron Absorbing Glass: CdO–Si-$O_2$–$B_2O_3$ System", J. Amer. Chem. Soc., 1951, 34 (3) pp. 82–86.

*Primary Examiner*—John F. Terapane
*Assistant Examiner*—John M. Covert
*Attorney, Agent, or Firm*—Allen F. Westerdahl; Judson R. Hightower

[57] ABSTRACT

A porcelain enamel composition as a neutron absorbing material can be prepared of a major proportion by weight of a cadmium compound and a minor proportion of compounds of boron, lithium and silicon. These compounds in the form of a porcelain enamel coating or layer on several alloys has been found to be particularly effective in enhancing the nuclear safety of equipment for use in the processing and storage of fissile material. The composition of the porcelain enamel coating can be tailored to match the coefficient of thermal expansion of the equipment to be coated and excellent coating adhesion can be achieved.

7 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PORCELAIN ENAMEL NEUTRON ABSORBING MATERIAL

The U.S. government has rights in this invention pursuant to a contract between the U.S. Department of Energy and E.I. du Pont de Nemours and Company.

BACKGROUND OF THE INVENTION

1. Field of the Invention

The present invention relates to neutron absorbing material and, more particularly, to a porcelain enamel material having neutron absorbing properties used for coating processing and storage equipment for use in the nuclear industry.

2. Description of the the Prior Art

The design of chemical process equipment, such as piping, retention or reaction vessels, material handling and storage equipment, for nuclear industrial operation requires a consideration of nuclear criticality whenever there is a possibility of the presence of fissile material in the process stream. A criticality is an uncontrolled nuclear reaction resulting in an intense release of radiation and heat. In the absence of shielding, a criticality presents a high potential for death of persons nearby (within 50 feet). The political or public impact of such an event is even greater. Public reaction to such an event has resulted in extensive facility shutdowns and lawsuits. Even near criticality incidents have resulted in similar public reaction. It is therefore imperative that the nuclear industry do whatever is necessary to prevent unplanned nuclear criticality.

Basically, the known physical and nuclear parameters are used to assure that accumulations of fissile material are maintained subcritical by geometry and mass control. In addition to these physical parameters in the structural design of equipment, the use of neutron absorbing materials (also referred to as "neutron poisons") can increase the level of criticality control associated with a piece of equipment.

One approach to providing a neutron absorbing protection is to fabricate the process equipment of a material that includes one or more known neutron poisons such as boron, cadmium, hafnium, and gadolinium. For example, stainless steel alloy that contains boron as a constituent has been commonly used for the fabrication of reaction vessels, piping and storage racks in the nuclear industry. The use of borated stainless steel, however, is very expensive because its fabrication requires special alloy melts, castings and in some cases extensive machining.

There is also uncertainty about the corrosion properties of the specially tailored alloys that may require extensive corrosion testing. For example, borated stainless steel equipment might have to be replaced sooner on the basis of a small acceptable wall loss for criticality control rather than because of a lack of physical integrity of the equipment.

Another approach, disclosed in U.S. Pat. No. 4,298,579 is a centrally arranged neutron absorber rod in a tank containing a plutonium solution. The disclosure of this patent also suggests providing a tank wall with neutron absorbing material to be applied, in one instance, as a separate layer in the form of a suitable enamel. The disclosure, however, does not provide any details concerning the proposed enamel nor is there any suggestion concerning the form, composition or properties of the enamel layer.

Glasses containing boron, cadmium and other neutron absorbers are known in the nuclear industry. See, for example Sun et al., "Neutron Absorbing and Transmitting Glasses", *The Glass Industry,* 1950, 31 (10) pp. 507–515 and Melnick, et al., "Neutron-Absorbing Glass: $CdO-SiO_2-B_2O_3$ System", *Journal of the American Ceramic Society,* 1951, 34(3) pp. 82–86. Such glasses while useful in a small scale laboratory setting may not meet the physical integrity requirements for large scale processing and storage equipment and are not suitable for application as porcelain enamel coatings.

SUMMARY OF THE INVENTION

Accordingly, it is an object of the present invention to provide an improved neutron absorbing material for use with processing and storage equipment where fissile material may be present. Another object of this invention is to provide a safe, versatile and cost-effective alternative to the use of borated stainless steel and other neutron absorbing methods for enhancing nuclear safety of nuclear industry process and storage equipment. Another object is to provide a means for existing designs of processing and storage equipment to be made safer or to reduce the safe spacing of equipment with respect to nuclear criticality for increasing process or storage efficiency. Still another object of this invention is to provide a method of coating processing or storage equipment with a neutron absorbing material having a coefficient of thermal expansion compatible with said equipment. These and other objects will become apparent to those skilled in the art from the following specification and claims.

These and other objects are accomplished by providing a porcelain enamel composition as a neutron absorbing material. It has been found that porcelain enamel neutron absorbing material can be prepared of a major proportion by weight of a cadmium compound and a minor proportion of compounds of boron, lithium and silicon. These compounds in the form of a porcelain enamel coating or layer on several alloys has been found to be particularly effective in enhancing the nuclear safety of equipment for use in the processing and storage of fissile material. In addition, it has been found that the composition of the porcelain enamel coating can be tailored to match the coefficient of thermal expansion of the equipment to be coated and that excellent coating adhesion can be achieved. Also where extremely corrosive conditions exist, it has been found that the porcelain enamel layer can be adequately protected by a coating of polymerized tetrafluoroethylene, such as Teflon or Fluoroshield .

DETAILED DESCRIPTION OF THE INVENTION

Figure 1:
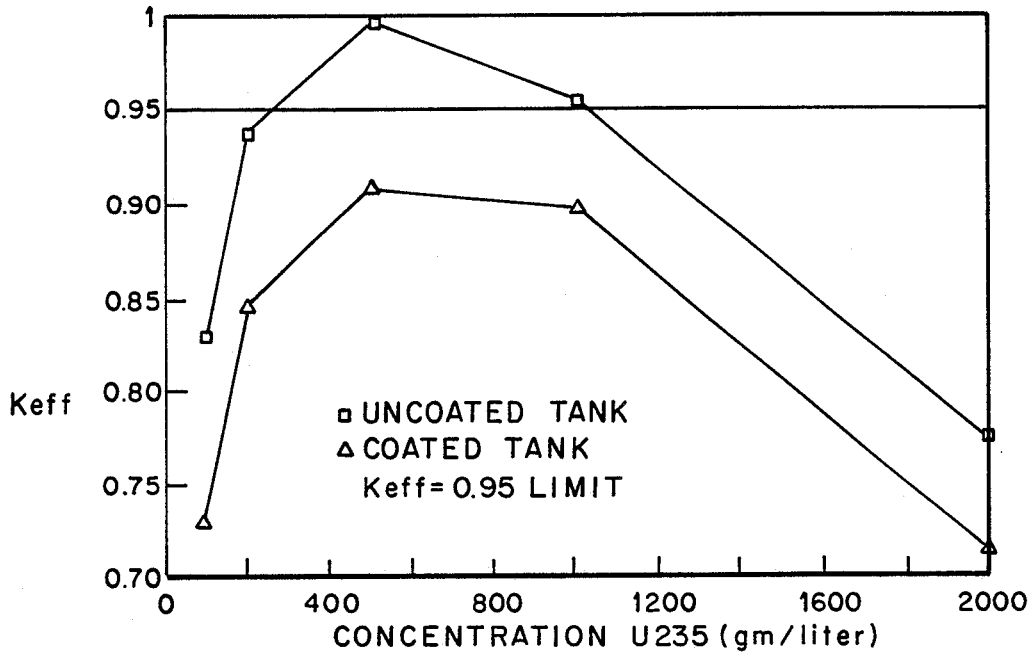
FIG. 1 shows effect of porcelain enamel coating on the nuclear safety of generic processing tanks at various concentrations of U-235.

A preferred embodiment of the present invention can be illustrated by reference to a method of coating of a type 304-L stainless steel vessel with a layer of porcelain enamel. Type 304-L stainless steel is a preferred material of construction for many reaction vessels in nuclear materials processing and a coating composition was developed to be physically compatible therewith. For the purposes of this specification, the primary physical parameter for compatibility of the materials being that the coefficients of thermal expansion should be close enough to prevent cracking of the porcelain enamel layer.

Accordingly an effective criticality safe reaction vessel can be fabricated from type 304-L stainless steel by providing a 10 mil thick layer of porcelain enamel on the steel surface. The porcelain enamel has the approximate composition:

| | |
|---|---|
| CdO | 69.5% |
| $B_2O_3$ | 15.5% |
| $Li_2O$ | 2.5% |
| $SiO_2$ | 12.0% |

Coating a stainless steel vessel with a porcelain layer of the above approximate composition requires the basic steps of (a) porcelain enamel preparation, (b) metal preparation, (c) spraying, and (d) firing. An additional step, providing a layer of a protective material, may be required in some situations to protect the porcelain layer from exposure in certain corrosive conditions.

A. Porcelain Enamel Preparation

The porcelain enamel composition is milled using conventional techniques in an aqueous suspension with the following mill addition:

| | |
|---|---|
| Porcelain Enamel frit | 1000 |
| Colloidal Silica | 20 |
| Magnesium Sulfate | 2.5 |
| Sodium Meta Silicate | 1.25 |

Milling is continued until all of the glass except a 1% residue passes through a 200 mesh screen (U.S. Standard). It has been found that a specific gravity of 2.00 for the slurry (slip) is the most effective for spraying on the metal surface. However, due to the sensitive nature of the wet coating, the specific gravity may have to be adjusted based on the ambient temperature and humidity. Spraying is the preferred method of applying tee coating due to the density of the glass and its delicate suspension in the slip.

B. Metal Preparation

As with conventional enameling practices, preparation of the metal surfaces to be coated is essential for adequate adhesion of the enamel coating. Grease and stain should be removed. Although any suitable metal cleaning technique can be used, sandblasting or etching are the preferred surface preparation techniques. Surface irregularities such as welds should be ground smooth prior to sandblasting or etching. After surface preparation is complete, scratching or gouging the metal surface should be avoided, because if has been found that such surface indentations can cause spalling.

C. Spraying the Prepared Metal Surface

It is desirable to apply sufficient glass slip or slurry on the metal surface to achieve an enamel thickness of at least 10 mils with a practical upper limit of about 20 mils. It has been found that spraying is the preferred method of application and that the enamel must be sprayed in a fine spray. However, the sprayed slip tends to run or slide on the metal surface when the wet thickness exceeds 4 or 5 mils. By careful application techniques, it is possible to apply 6 to 8 mils of enamel prior to each firing. It has been found that multiple passes with the spray gun, laying one coat over the other and careful attention to the moisture content of the slip will permit application of an optimum thickness of enamel for each firing cycle. Thus two coatings and firings will achieve the desired porcelain enamel thickness of at least 10 mils.

D. Firing the Enamel Coatings

The enamel coating (bisque) on the metal surface should be permitted to dry before firing. The firing parameters will vary depending on the shape and surface area being fired. By way of example, a $4\times4\times\frac{1}{4}$ inch sample plate was satisfactorily fired at 1320° F. for 8 minutes. Also a $4'\times6''\times\frac{1}{4}''$ tubular member was satisfactorily fired at 1100° F. by alternately firing for 8 minutes with 2 minutes removed for a total of 100 minutes. After firing the initial layer, defects may be ground off or repaired, followed by respraying and a second firing to reach at least a 10 mil porcelain layer. Normally with proper firing, the porcelain surface should have a good gloss, however, slight overfiring which yields a lower luster finish is not detrimental. Those skilled in the art will recognize that testing different firing cycles should be done to achieve an optimum porcelain layer on the metal surface for a particular application.

In addition to type 304-L stainless steel, the porcelain enamel coating has been successfully applied to the following trademarked alloys:

| | |
|---|---|
| HASTELLOY C-22 | CARPENTER 20-Cb3 |
| HASTELLOY C-276 | INCOLOY 825 |
| HASTELLOY B-2 | INCONEL 600 |
| HASTELLOY G-3 | INCONEL 625 |
| HASTELLOY G-30 | INCONEL 690 |
| MILD STEEL 1020 | |

The effectiveness of the porcelain enamel coating having neutron absorbing properties for use or processing or storage equipment was determined by subjecting porcelain-coated stainless steel components to a variety of tests as shown in the following examples. An additional protective step will be described in connection with the chemical integrity tests, Example III.

EXAMPLE I

Mechanical Impact Test

Type 304-L stainless steel sample plates and 6" diameter cylinders were coated with porcelain enamel of the previously described composition to an average thickness of 10 mils. The coated plates and cylinders were impacted with a 5/16" radius sphere at forces of up to 72 in-lb. The samples incurred only localized damage. The porcelain enamel in an area approximately 0.25" in diameter at the point of impact was pulverized with little or no spalling of surrounding material. Increased impact force resulted in little or no change in the extent of damage. The exposure of the stainless steel substrate was limited to the points of impact and did not significantly affect the overall integrity of the coating.

EXAMPLE II

Thermal Shock Tests

Three stainless steel cylinders (6"×6"×¼") coated with the preferred porcelain enamel (average thickness—10 mils) composition were heated to 150°, 200°, and 250° C., then rapidly quenched with water at each temperature. In the first test, ambient water was sprayed onto the outside (coated) surface of the hot cylinders. No damage was observed after 45 tests. Next, in order to quench from the inside, the hot cylinders were filled with ambient temperature water. In 55 tests, covering the three temperatures, spalling occurred on only one cylinder. This occurred on an edge and affected an area only 0.25" wide by 1.25" long.

Two cylinders were cycled 50 times between 50° C. and 155° C. using an oven and fan. No visual physical damage to the coating was observed.

It was concluded from the tests of Examples I and II that accidental thermal shock and mechanical impact will not significantly affect the integrity of the porcelain coating for the purpose of neutron absorption.

EXAMPLE III

Chemical Integrity Tests

A. Type 304-L stainless steel plates were coated with the preferred porcelain enamel composition to a thickness of about 10 mils. Standard leaching tests were conducted on the porcelain enamel samples with 51% nitric acid, nitric acid vapor, and deionized water. All were tested at 90° C. for 28 days. The tests using deionized water showed very little loss of cadmium or boron to the leachant. However tests with nitric acid and nitric acid vapor showed significant loss of cadmium and boron to solution and separation from the stainless steel substrate. Because these were severe overtest conditions another more realistic test was designed to assess the consequences of short term periodic contact with nitric acid.

B. An apparatus was set up to drop nitric acid onto a heated porcelain enamel sample plate so that each droplet would evaporate before the next was applied. This was intended to simulate a small leak. When the plate was held at 110° C., 50 drops resulted in localized damage approximately 0.5 inch in diameter and 0.003 inch deep. At 90° C. 0.002 inch was lost. After these tests it was apparent that some means of protecting the enamel from chemical attack would be necessary to ensure that the cadmium and boron remain in place at all times.

C. A Fluoroshield (a proprietary polymerized tetrafluoroethylene protected by trademark) coating was applied over the porcelain enamel to protect it from the nitric acid. Sample plates were coated and tested to determine if the Fluoroshield provided sufficient protection from the acid. The Fluoroshield layer adhered very well to the enamel and no damage was detected after chemical testing.

EXAMPLE IV

Nuclear Safety Analysis and Tests

Figure 2:
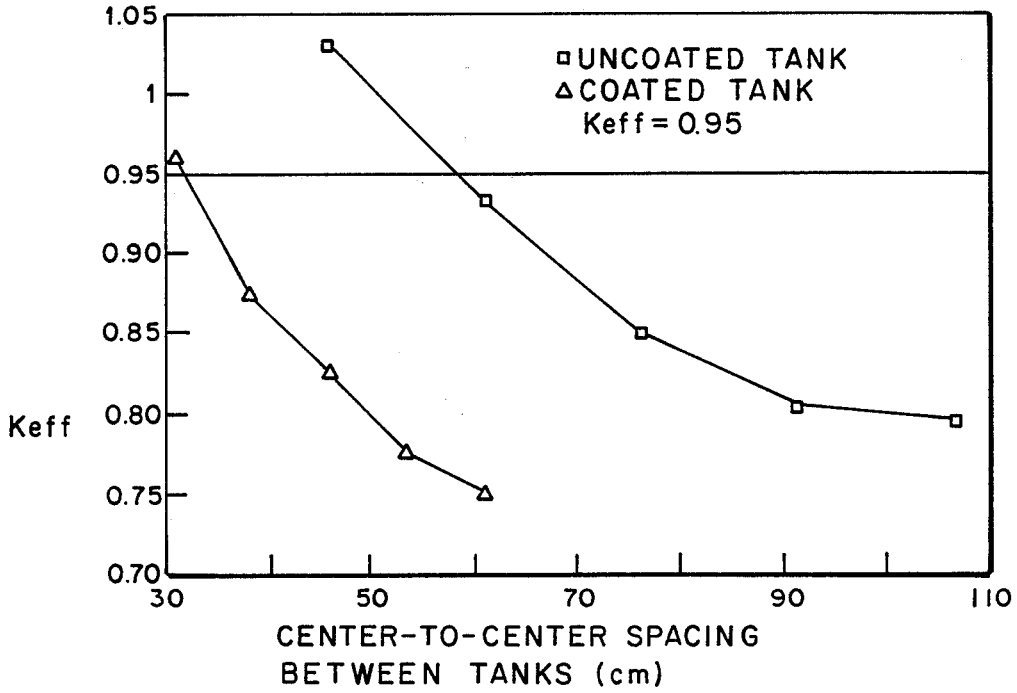
FIG. 2 shows the effect of porcelain enamel coating on the allowable safe spacing of processing tanks at a specific concentration of U-235.

The results of nuclear criticality analysis (Monte Carlo calculations) are best illustrated by reference to FIGS. 1 and 2. FIG. 1 shows the effect of lowering the criticality factor ($K_{eff}$) in generic processing tanks by the porcelain enamel coating at various concentrations of U-235. FIG. 2 shows the effect of the porcelain enamel coating on the allowable safe spacing (at $K_{eff}<0.95$) of generic tanks at a specific concentration of U-235. The criticality factor, $K_{eff}$, is a measure of neutron multiplication in a fissile system. A $K_{eff}$ of 1.0 is the point of nuclear criticality, above that point the nuclear reaction accelerates uncontrollably. The safe limit for $K_{eff}$ has been defined as 0.95.

It is apparent, from FIGS. 1 and 2, that use of the neutron absorbing porcelain enamel on nuclear processing equipment can make that equIpment significantly safer with respect to prevention of nuclear criticality. FIG. 1 shows that a generic tank which is unsafe for a wide range of U-235 concentrations can be made safe for all U-235 concentrations when the coating is used. FIG. 2 shows that the allowable safe spacing between generic tanks at a U-235 concentration of 500 g/liter can be reduced by approximately 45% if the neutron absorbing porcelain enamel is used.

Further Monte Carlo calculations for specific processing vessels showed that with the porcelain enamel, the vessels are completely safe under all credible normal or upset process conditions, whereas without the porcelain enamel, access to the vessels must be limited in order for them to be safe. This data has been confirmed by neutron attenuation experiments. The porcelain enamel coated samples met or exceeded existing neutron attenuation criteria. When comparing the nuclear safety of porcelain enamel coated versus borated steel vessels the coated are much safer, especially when considering allowable wall corrosion loss. (As the wall corrodes away in the borated steel vessel, neutron absorbing material is lost.)

The foregoing tests and examples are intended as illustrative and not to limit the invention, which is intended as only limited as indicated in the appended claims.

What is claimed is:

1. A neutron absorbing composite comprising a porcelain enamel coating adhered to a chemical reaction vessel containing a process stream of fissile material, said coating consisting essentially, by weight, of a major proportion of oxide of a cadmium compound and minor proportions of oxides of a boron compound, a lithium compound, and a silicon compound in the form of a porcelain enamel coating, said coating applied to said vessel in a thickness sufficient to prevent criticality.

2. The composite of claim 1, wherein said composite is a homogeneous coating of said porcelain enamel on said vessel, said vessel made of a metal alloy, said coating consisting essentially of about 69 wt. % CdO, 16 wt. % $B_2O_3$, 3 wt. % $Li_2O$ and 12 wt. % $SiO_2$, said thickness of said coating being at least approximtely 10 mils.

3. The composite of claim 1, wherein said porcelain enamel coating is protected by a coating of a polymerized tetrafluoroethylene.

4. The method of making a chemical reaction vessel for the processing of a stream of fissile nuclear naterials having nuclear critically safe characteristics which comprises coating said vessel with a porcelain enamel having neutron absorbing properties and consisting essentially of a major proportion, by weight, of a cadmium compound and a minor proportion, by weight, of a boron compound, a lithium compound, and a silicon compound, said coating in a thickness sufficient to prevent criticality.

5. The method of claim 4 wherein said vessel is fabricated of a metal alloy.

6. The method of claim 4, wherein said porcelain enamel coating is protected by a coating of a polymerized tetrafluoroethylene.

7. The method of claim 5, wherein said metal alloy is stainless steel.

* * * * *